United States Patent [19]

Lang

[11] Patent Number: 5,413,478
[45] Date of Patent: May 9, 1995

[54] BURNER WITH AN ELECTRIC IGNITION DEVICE

[75] Inventor: Werner Lang, Jestetten, Germany

[73] Assignee: Asea Brown Boveri Ltd., Baden, Switzerland

[21] Appl. No.: 124,539

[22] Filed: Sep. 22, 1993

[30] Foreign Application Priority Data

Oct. 23, 1992 [EP] European Pat. Off. .......... 92118170

[51] Int. Cl.⁶ .................................................. F23D 14/00
[52] U.S. Cl. ............................... 431/265; 431/264; 431/351
[58] Field of Search ............... 431/350, 351, 173, 264, 431/265, 266, 173, 8, 10, 11

[56] References Cited

U.S. PATENT DOCUMENTS

| | | | |
|---|---|---|---|
| 2,790,490 | 4/1957 | Smith | 431/265 |
| 3,637,336 | 1/1972 | Velie | 431/265 |
| 4,298,338 | 11/1981 | Babington | 431/265 |
| 4,894,005 | 1/1990 | Keller | 431/351 |
| 5,169,302 | 12/1992 | Keller | 431/351 |
| 5,249,955 | 10/1993 | Kuhn et al. | 431/264 |

FOREIGN PATENT DOCUMENTS

0210462A1 2/1987 European Pat. Off. .
0321809B1 5/1991 European Pat. Off. .
0521325A1 1/1993 European Pat. Off. .

*Primary Examiner*—James C. Yeung
*Attorney, Agent, or Firm*—Burns, Doane, Swecker & Mathis

[57] ABSTRACT

A burner with an electric ignition device, for use in an internal combustion engine, a combustion chamber of a gas turbine set, or for a furnace installation, includes two hollow part-conical bodies that are positioned to form a conical combustion space and are offset so that longitudinally extending, tangential inlet slots are formed to conduct combustion air into the combustion space. Inflow orifices provided at the tangential inlet slots feed fuel to the inflowing combustion air to be mixed and carded into the combustion space. An electric ignition device is positioned so that spark producing ends are positioned at a central vertex region of the combustion space. The position of the ignition device protects the device from excessive thermal loading, and allows the burner to be operated at a higher, more efficient temperature.

7 Claims, 1 Drawing Sheet

BURNER WITH AN ELECTRIC IGNITION DEVICE

BACKGROUND OF THE INVENTION

1. Field of the Invention

The invention relates to a burner with an electric ignition device.

2. Discussion of Background

U.S. Pat. No. 4,932,861 discloses a burner with two part-conical bodies. This burner has two tangentially aligned inflow slots for air. In the region of the inflow slots, the air is mixed with fluidized fuel by means of inflow orifices. Liquid, pulverulent or gaseous fuel can be admixed.

In the case of burners of cylindrical or conical design, which are ignited electrically by means of spark plugs, the ignition device is as a rule arranged with a lateral offset from the burner axis in the region between the central fuel inlet and the flame front. This type of arrangement of the ignition device is found typically in aircraft engines. This arrangement has the disadvantage that the spark plugs close to the hottest zone of the burner are exposed to an intensive thermal stress which can reduce their service life. In addition, the working temperature of the burner must in this case be set to a comparatively low level, in order to avoid thermal overloading of the spark plugs.

SUMMARY OF THE INVENTION

These and other problems in the art are overcome by the invention. Accordingly, one object of the invention, is to provide a novel burner with an electric ignition device, wherein the spark plugs are better protected against thermal loading, so that the burner can be operated at higher working temperatures.

The advantages achieved by the invention are to be regarded in that the burner, which is operated at a higher working temperature, has a markedly higher efficiency. It is also found that fouling of the electrodes of the spark plugs during operation is substantially reduced, so that their service life is advantageously extended.

The further embodiments of the invention are subjects of the dependent claims.

BRIEF DESCRIPTION OF THE DRAWINGS

A more complete appreciation of the invention, its further development and many of the attendant advantages thereof will be readily obtained as the same becomes better understood by reference to the following detailed description when considered in connection with the accompanying drawings, which represent merely one possible embodiment, wherein.

DETAILED DESCRIPTION OF THE PREFERRED EMBODIMENTS

Figure 1:
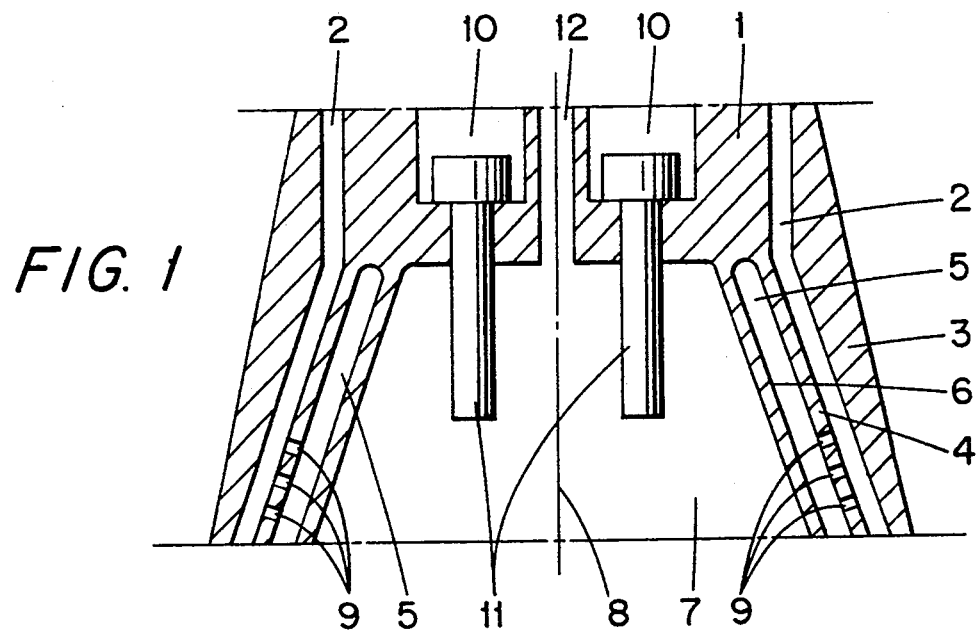
FIG. 1 shows a partial section through a first burner according to the invention.

Referring now to the drawings, wherein like reference numerals designate identical or corresponding parts throughout the several views, FIG. 1 shows a partial section through a double-cone burner, with only the region around the vertex of the burner actually being diagrammatically represented. As illustrated in FIG. 1, the vertex region of the burner is the area immediately around the closed, narrow end of the burner. The burner has a downward-opening burner housing 1, through which at least one fuel duct 2 passes. The fuel duct 2 is sealed against the outside by a wall 3 and is separated by a partition 4 from a combustion air duct 5. The combustion air duct 5, which is separated by a partition 6 from the actual combustion chamber 7, opens in this combustion chamber 7 in the known form of two tangentially aligned inflow slots. To improve clarity, these inflow slots are not shown here and are illustrated and described in U.S. Pat. No. 4,932,861. The burner has a central axis 8. In the partition 4, inflow orifices 9 are provided which pass fuel from the fuel duct 2 into the combustion air duct 5, where it is mixed with the combustion air. In the burner housing 1, two bores 10 are provided, into each of which a spark plug 11 is screwed with a pressure seal. The spark plugs 11 protrude into the combustion chamber 7, so that their ignition electrodes, which are not shown and which are located at the lower end, can release ignition sparks into the combustion chamber 7. The supply of the spark plugs 11 with electrical energy is not described here in more detail, since such energy supplies, as a rule of explosion-proof design, are part of the state of the art. The spark plugs 11 can be supplied with ignition energy independently of one another, simultaneously or alternately, so that an ignition spark is always generated, i.e. even in the event of failure of one of the spark plugs 11. The energy supply is designed in such a way that a visual check indicates the ignition sparks. In this way, the failure of one of the spark plugs 11 can be detected at an early stage, and the replacement of the defective spark plug 11 during a convenient period, which is advantageous of the operation of the plant, can be prepared.

In a special embodiment of the burner, an additional bore 12 introduces combustible gas through the burner housing 1 into the region of the spark plugs 11, whereby an ignitable gas mixture is particularly reliably formed in this region. The additional bore 12 is actively connected to the fuel duct 2. The additional bore 12 can consist of a plurality of bores whose outlets are distributed over the vertex region of the burner. The additional bore 12 need not be as shown here, parallel to the central axis 8 of the burner housing 1, but may be arranged at an angle thereto. It is likewise possible to the additional bore 12 through the partition 6 further downward and to let it lead into the combustion chamber 7 only in the vicinity of the ignition electrodes.

In a gas-operated burner, a ratio of 50 between the sum of the cross sections of the inflow orifices 9 and the cross section of the additional bore 12 leads particularly quickly and reliably to an ignitable mixture. Tests have shown that a ratio in the range between 30 and 60 is necessary for satisfactory functioning of the ignition device. If a ratio below the indicated range is set, the flame formation in the burner is disturbed, whereas a ratio above this range causes unreliable ignition behavior. If gaseous fuels having different calorific values or another consistency are used, the cross-sectional ratio should be adjusted correspondingly in order to obtain optimized running behavior.

Figure 2:
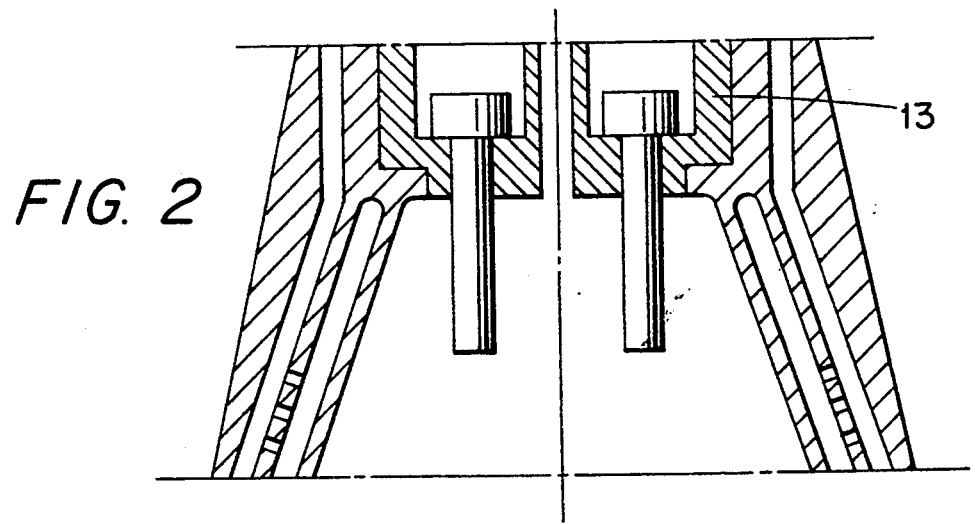
FIG. 2 shows a partial section through a second burner according to the invention.

FIG. 2 diagrammatically shows a burner which is slightly modified as compared with the burner shown in FIG. 1. The spark plugs 11 are mounted in a holder 13 which has the same central axis 8 as the burner housing 1. In this case, the bores 10 are made in the holder 13. This holder 13 is inserted gas-tight into the burner housing 1 and, on the occasion of inspections, can be separated from the burner and moved out, without dismantling the burner housing. Any gas supply for the additional bore 12 and also the energy supply to the spark plugs 11 are connected to the holder 13 and are dismantled together with the holder 13. Depending on the type of construction of the burner, the holder 13 can also be designed in the manner of a lance.

Figure 3:
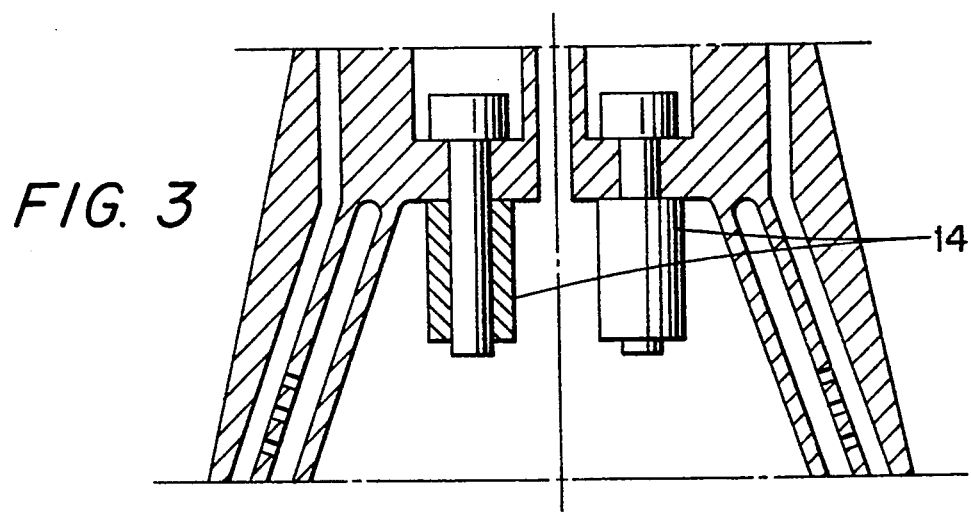
FIG. 3 shows a partial section through a third burner according to the invention.

FIG. 3 shows a partial section through a burner, in which the spark plugs 11 are protected from thermal influences by a cover 14. The cover 14 can be of various designs. It is possible, for example, to combine the two covers 14 into a common block or to design them in such a way that they partially cover the spark plugs 11 only in the particularly exposed areas.

The burner is fed as a rule with precompressed air with which the fuel is mixed. Liquid, pulverulent or gaseous fuel can be admixed. With this type of construction, the flame front of the burner is sufficiently far below the spark plugs 11, so that the latter cannot be thermally overloaded. This burner design is particularly suitable as a pilot burner in the center of a silo combustion chamber, in which the other burners surround the central pilot burner like a honeycomb. It is also possible, however, to use this burner as a pilot burner in an annular combustion chamber.

To explain the mode of action, the drawing, in particular FIG. 1, is considered in more detail. On starting, precompressed air is initially fed to the burner through the combustion air duct 5. Simultaneously with the start of the fuel feed, the energy supply to the spark plugs 11 is also switched on. As soon as an ignitable fuel/air mixture is reached in the combustion chamber 7, the burner is ignited and the flame front of the ignition flame migrates downward through and exits the combustion chamber 7. The formation of the fuel/air mixture is advantageously accelerated by gas which is fed in through the additional bore 12. As soon as a stable ignition flame has formed, combustion air and fuel are also fed to the remaining burners and are then likewise ignited. In the case of relatively large installations, it is possible also to switch on the remaining burners individually or in groups. After the remaining burners have been ignited, the ignition device is as a rule switched off. The burner then either continues to operate as a normal burner together with the remaining burners, or its fuel feed is stopped, so that it goes out, but air then still flows through the combustion air duct 5 and ensures that the burner and, with it, the spark plugs 11 are not thermally overloaded. If, however, the remaining burners are operated with another fuel, for example a liquid fuel, a separate gas supply, for example with propane gas, is provided for the pilot burner. This separate gas feed is as a rule stopped after successful ignition of the remaining burners.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A burner with an electric ignition device, comprising:

two hollow part-conical bodies positioned to form a conical combustion chamber having a vertex end, the bodies having longitudinal axes extending parallel and offset so that tangential inflow slots for combustion air fed into the conical combustion chamber through a combustion air duct are formed, which duct has, in a region of the inflow slots, inflow orifices through which fuel is fed in and mixed with the combustion air;

an electric ignition device positioned centrally in the vertex end of the conical combustion chamber; and at least one fuel duct disposed in the vertex end adjacent to the electric ignition device;

wherein a ratio of a sum of cross-sectional areas of the inflow orifices to a cross-sectional area of the fuel duct is in a range of 30 to 60.

2. The burner with an electric ignition device as claimed in claim 1, wherein the ignition device includes at least two spark plugs which are chargeable with ignition energy, each spark plug being provided with a separate ignition circuit, ignition circuits being independently operational.

3. The burner with an electric ignition device as claimed in claim 2, further comprising a cover for the spark plugs that at least partially covers a portion of the spark plugs extending into the combustion chamber.

4. The burner with an electric ignition device as claimed in claim 2, further comprising a cover for the spark plugs that at least partially covers a portion of the spark plugs extending into the combustion chamber, the cover including a monolithic block.

5. The burner with an electric ignition device as claimed in claim 2, further comprising means for firing the ignition devices alternately.

6. The burner with electric ignition device as claimed in claim 2, further comprising means for firing the ignition devices simultaneously.

7. The burner with an electric ignition device as claimed in claim 1, wherein the ratio between the sum of cross sectional areas of the inflow orifices and the cross sectional area of the fuel duct is 50.

* * * * *